D. C. LARKINS,

Joint Inventor with and assignee of G. D. GREENLEAF, assignor to WHITMAN & BURRELL.

Apparatus for Treating Milk.

No. 9,744. Reissued June 7, 1881.

*Attest:*

F. H. Schott

A. R. Brown.

*Inventor:*

Whitman & Burrell assignee by mesne asst of G. D. Greenleaf & D. C. Larkin

Jno J. C. Fassler atty

UNITED STATES PATENT OFFICE.

DARIUS C. LARKINS, OF HENDERSON, (JOINT INVENTOR WITH AND ASSIGNEE OF G. D. GREENLEAF,) ASSIGNOR TO WHITMAN & BURRELL, OF LITTLE FALLS, NEW YORK.

APPARATUS FOR TREATING MILK.

SPECIFICATION forming part of Reissued Letters Patent No. 9,744, dated June 7, 1881.

Original No. 76,749, dated April 14, 1868. Application for reissue filed January 18, 1881.

*To all whom it may concern:*

Be it known that GEORGE D. GREENLEAF and DARIUS C. LARKINS, of Henderson, in the county of Jefferson and State of New York, did invent certain new and useful Improvements in Apparatus for Treating Milk; and I do hereby declare the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
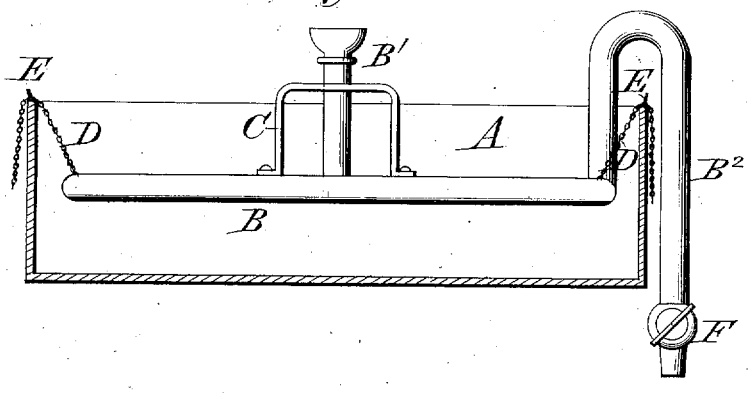
Figure 2:
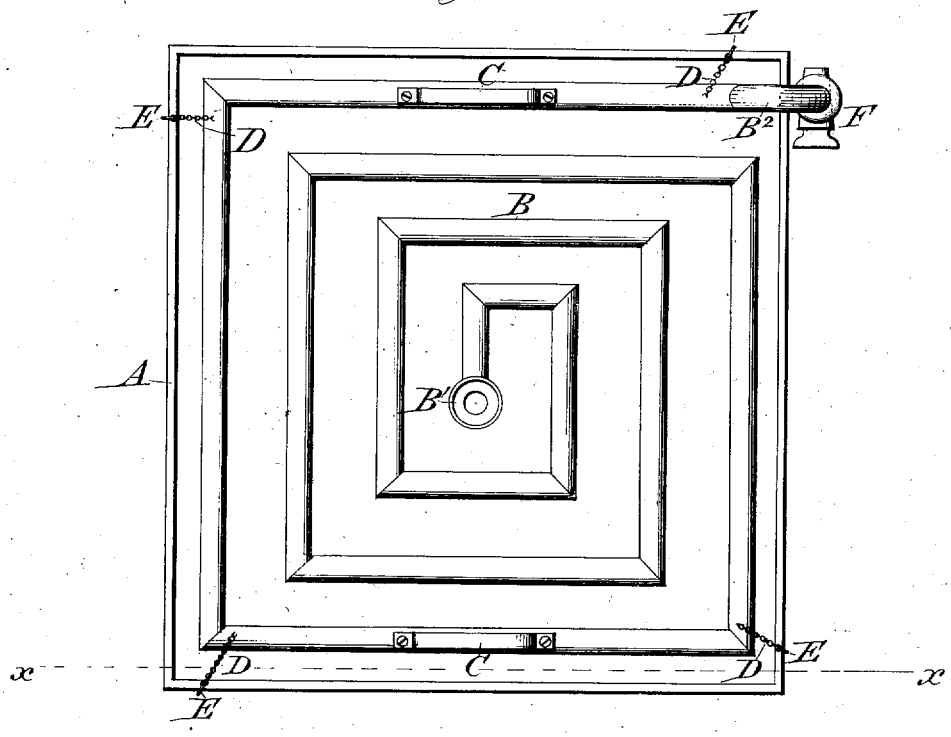

Figure 1 is a sectional elevation of an apparatus made according to this invention, the line of section being seen at *x x*, Fig. 2. Fig. 2 is a plan view.

Similar letters of reference indicate like parts.

The object of this invention is to provide a convenient and economical apparatus by which milk can be readily heated or cooled, according to the use to be made of it; and it consists in placing a coiled pipe within a pan or other receptacle for the milk, through which pipe a heating or cooling medium is passed, the pipe being made vertically adjustable within the milk-receptacle, so that it can be laid down next to the bottom of the vat if the object is to heat the milk, or suspended above the bottom if the milk is to be cooled.

Cheese and butter manufacturers have found much difficulty in cooling milk for dairy purposes soon enough and sufficiently to prevent it from becoming sour. This apparatus for treating milk obviates this difficulty. It also cheapens the making of cheese, and adds largely to the product in making butter.

According to this invention but one vat A is used, into which the milk to be treated is poured, instead of two, as in the mode commonly practiced.

B is a coil of pipe, which may be arranged in the general form of the vat or pan, having its commencement at its center, where its end B′ is turned up and provided with a funnel-shaped mouth. Its other end is turned over the edge of the vat and carried down below the level of the same, so as to form a siphon, $B^2$, whose outlet is governed by a stop-cock, F. The cooling or heating medium, which is introduced at the funnel B′, passes through the pipe and out through the siphon, its discharge therefrom being governed by the faucet F.

The coils at opposite sides are provided with handles C C, by which to lift the pipe out of the vat when it is necessary so to do.

If the milk in the vat is to be cooled, the coil is suspended at such a height as barely to submerge it by means of the chains D and the hooks E, and a current of cold or iced water is then passed through the pipe. That portion of the milk which surrounds the elevated pipe will become cooled first, and since it will immediately descend, it induces a current in the vat, that portion of the milk whose temperature has not been reduced flowing upward to take the place of the cooled descending portion. The size of the pipe is a question of judgment; but a pipe one inch or one inch and a half in diameter will usually be large enough.

When used for heating milk for cheese-making the pipe is lowered until its coils rest on the bottom of the vat, when steam or hot water is passed through it in a similar way as explained of cold water. The curd of the cheese may now be worked to the bottom of the vat, to prevent it from settling in a hard mass, as in the common process of making cheese. To allow of such working, and to prevent the curd from becoming hard in spots under the water-pipe, the said pipe may be made semicircular, and the flat sides of the coils laid on the bottom of the vat, thus giving the operator an opportunity to stir every part of the curd.

It will be observed that by means of this invention the same apparatus can be used for both cooling and heating milk, the pipe being suspended in the former case near the top of the milk, and lowered and allowed to rest near or on the bottom of the vat in the other.

What is claimed, and desired to be secured by Letters Patent, is—

1. The herein-described improvement in the art of cooling milk in vats for raising cream, which consists in suspending within the vat a coil of pipe, through which a cooling-fluid is circulated, and adjusting said coil to remain at a point just beneath, but close to, the upper surface of the milk, substantially as specified.

2. A milk heating or cooling apparatus consisting of a vat having a coil of pipe suspended adjustably within it, through which coil a suitable fluid flows to cool or heat the milk, and provided with means for adjusting the said coil of pipe vertically within the fluid contained in the vat, substantially as set forth.

3. A vat adapted for setting milk, and provided with an adjustable coil of pipe, through which water or other suitable fluid is made to flow, and with means for adjusting said coil, the inlet to the coil being above the vat, and the outlet on the outside and independent of the vat, substantially as shown and described.

In testimony whereof I affix my signature in presence of two witnesses.

DARIUS C. LARKINS.

Witnesses:
PAUL C. MAXON,
S. M. RIPLEY.